United States Patent Office 2,810,726
Patented Oct. 22, 1957

2,810,726

ALPHA-HALO-ALPHA'-IMINO-SUBSTITUTED PYRROLINES AND PIPERIDEINES AND THEIR ACID SALTS AND METHOD FOR THEIR PREPARATION

Edward G. Howard, Jr., Hockessin, Del., assignor to E. I. du Pont de Nemours and Company, Wilmington, Del., a corporation of Delaware No Drawing. Application January 10, 1956,
Serial No. 558,207

25 Claims. (Cl. 260—296)

This invention relates to new nitrogen-containing heterocyclic compounds and to methods for their preparation. More particularly this invention relates to novel nitrogen-containing heterocyclic compounds having a substituted pyrroline or piperideine structure and methods for their preparation.

Heterocyclic compounds which contain nitrogen and have a total of five to six nuclear atoms are of considerable interest, particularly since compounds containing such nuclei are found in many natural products or exhibit biological activity. For many of these compounds the methods of preparation that have been employed require several steps from readily available organic compounds.

It is an object of this invention to provide new nitrogen-containing heterocyclic compounds and methods for their preparation. A further object is to provide new nitrogen-containing heterocyclic compounds having a substituted pyrroline or piperideine structure and methods for their preparation. Other objects will appear hereinafter.

These and other objects of this invention are accomplished by providing new nitrogen-containing heterocyclic compounds, in the form of their free bases and acid salts, which have a five to six membered heterocyclic ring consisting of carbon atoms and one nitrogen atom wherein the ring carbons bonded to the ring nitrogen bear respectively an exocyclic nitrogen atom and an exocyclic halogen atom, and the remaining ring carbons each bear at most one monovalent substituent free from active hydrogen. The new compounds of this invention are nitrogen-containing heterocyclic compounds which have one nitrogen atom and four to five carbon atoms in the heterocyclic ring and have the nuclear carbons which are adjacent to the nuclear nitrogen directly attached respectively to an exocyclic nitrogen atom as an imino group and an exocyclic halogen atom having an atomic number of at least thirty-five, i. e., bromine or iodine.

These novel compounds have as a portion of the heterocyclic ring the unit

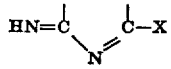

wherein X is bromine or iodine, i. e. halogen of atomic number 35 to 53, with the remaining portion of the ring consisting of a diradical having a two to three atom chain, in which the chain atoms are carbon, attached to and separating the ring carbons adjacent to the ring nitrogen. This diradical can be an alkylene radical having a chain of two to three carbon atoms, such as ethylene or trimethylene, or each carbon atom of such radical can have at most one further radical of preferably not over eight carbons laterally attached thereto. The diradical has the grouping $(CHR)_{2-3}$ wherein the R's are free from active hydrogen (Zerewitinoff). Suitable R's are hydrogen, halogen, hydrocarbon, or hydrocarbon having ether or thioether groups. Preferably not more than one of the R's in the two to three CHR groups are halogen, hydrocarbon, or substituted hydrocarbon.

One class of these nitrogen-containing heterocyclic compounds contains the pyrroline nucleus and can be represented by the formula:

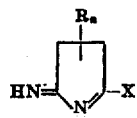

wherein X is a halogen with an atomic number of at least 35, R is halogen or monovalent hydrocarbon, or ether, including thioether-containing hydrocarbon radical, such as alkyl, thioalkyl, or aryl, preferably of not more than eight carbon atoms, n is a cardinal number of 0 to 2 and each ring carbon bears at most one monovalent substituent. This class of compounds can be called the α-halo-α'-iminopyrrolines. (Patterson and Capell, "The Ring Index," Reinhold, N. Y., 1940, page 43, wherein pyrroline is the name for a dihydropyrrole.)

The second class contains the piperideine nucleus and can be represented by the formula:

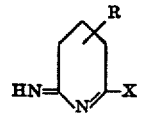

wherein X is a halogen with an atomic number of at least 35, R is a halogen or monovalent hydrocarbon, or ether, including thioether-containing hydrocarbon radical, such as alkyl, thioalkyl, or aryl, preferably of not more than eight carbon atoms, n is a cardinal number of 0 to 3 and each ring carbon bears at most one substituent. This class of compounds can be called the α-halo-α'-iminopiperideines. (Patterson and Capell, "The Ring Index," page 54, wherein piperideine is the name for a tetrahydropyridine.)

The new nitrogen-containing heterocyclic compounds of this invention are obtained by reacting under anhydrous conditions in the presence of a hydrogen halide in which the halogen is bromine or iodine, a dinitrile which is free from active hydrogen and has the cyano groups separated by a chain of two to three aliphatic carbon atoms, each bearing at least one hydrogen atom. Any substituents on this two to three aliphatic carbon chain are generally halogen, hydrocarbon or ether-containing hydrocarbon, including thioether-containing hydrocarbon.

The compounds of this invention are basic and are readily obtained as their acid salts. Thus, the compounds of this invention include the acid salts thereof, particularly of the halogen acids, such as the hydrobromides or hydroiodides thereof.

The following examples, in which the parts are by weight, illustrate the preparation of the compounds of this invention.

EXAMPLE I

*2-imino-6-bromopiperideine hydrobromide from glutaronitrile*

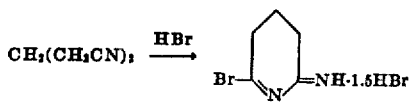

A round bottom, 2-neck flask was fitted with gas inlet and outlet tubes. The flask was heated with a flame, then cooled while nitrogen was passed through the flask. To the flask was added 88 parts of benzene (dried over sodium) which was then saturated with dry HBr gas at room temperature. When 2 parts of glutaronitrile were added to the mixture while the HBr flow was maintained, a white solid began to precipitate which was collected after 10 minutes of HBr addition and 30 minutes of standing. The hydrobromide of 2-imino-6-bromopiperideine was washed with benzene and dried at 58° C. under 1 mm. pressure. The yield was quantitative.

*Anal.*—Calc'd. for $C_5H_7N_2Br \cdot 1.5HBr$: C, 20.2; H, 2.88; N, 9.42; Br, 67.5. Found: C, 20.6; H, 3.30; N, 8.92; Br, 67.9.

This material was extremely hygroscopic and liberated HBr when exposed to moist air.

EXAMPLE II

2-imino-6-bromopiperideine

Ten parts of the HBr salt of Example I were added to a cold 10% solution of sodium carbonate in water. There was obtained 0.25 part of the free base as a solid which after recrystallization from water, melted at 79–82° C. (dec.).

*Anal.*—Calc'd. for $C_5H_7N_2Br$: C, 34.31; H, 4.04; N, 16.01; Br, 45.66. Found: C, 34.57; H, 4.28; N, 15.93; Br, 45.98.

A superior method to obtain this free base was to add the salt to a mixture of ice, water and sodium hydroxide in a high-speed blendor. A 20% solution of sodium hydroxide was added continuously always maintaining a slight excess of base. From 100 parts of salt, 17 parts of base resulted.

The reaction of an isocyanate with the imino group is shown as follows: To a solution of 8.8 parts of 2-imino-5-bromopiperideine in 50 parts of tetrahydrofuran was added 7.7 parts of p-chlorophenylisocyanate. A solid formed which was collected after standing overnight and after cooling in an ice bath amounted to 16 parts. After recrystallization the compound melted at 176–179° C. The compound has the structural formula:

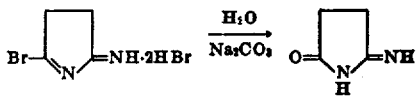

*Anal.*—Calc'd. for $C_{12}H_{11}N_3BrClO$: C, 43.86; H, 3.38; N, 12.79. Found: C, 44.32; H, 3.42; N, 13.01.

EXAMPLE III

2-imino-5-bromopyrroline hydrobromide from succinonitrile

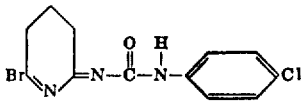

Dry hydrogen bromide was passed over a dry solution of 2 parts of succinonitrile in benzene. The resulting solid was filtered, washed with benzene, and dried under 1 mm. pressure at 56° C.

*Anal.*—Calc'd. for $C_4H_5N_2Br \cdot 2HBr$: C, 14.8; H, 2.17; N, 8.70; Br, 74.4. Found: C, 16.9; H, 2.43; N, 8.80; Br, 73.1.

A pyrrolidone was prepared from the pyrroline according to the following equation:

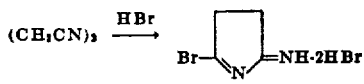

Solid 2-imino-5-bromopyrroline hydrobromide was added to cold 5% sodium carbonate solution until the pH was approximately 7. The resulting black material was recrystallized from hot water containing decolorizing carbon. A white crystalline solid resulted which proved to be 2-imino-5-pyrrolidone according to its infrared spectrum.

EXAMPLE IV

2-imino-3-(or 5-)phenyl-6-bromopiperideine hydrobromide and free base from α-phenylglutaronitrile

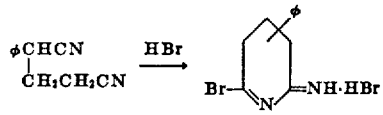

Dry hydrogen bromide was passed into a stirred mixture of 17 parts of α-phenylglutaronitrile (prepared according to the directions of Campbell, J. Chem. Soc. 1379 (1954)) in 88 parts of dry benzene. In a few minutes a white solid began to form which was collected (amounting to 32 parts) after hydrogen bromide had been added for one hour. A small sample was purified by shaking with cold water followed by drying and was recrystallized from ethyl alcohol.

*Anal.*—Calc'd. for $C_{11}H_{11}N_2Br \cdot HBr$: C, 39.79; H, 3.64; N, 8.34; Br, 48.13. Found: C, 39.10; H, 3.67; N, 8.55; Br, 47.23.

Some of the original material was dissolved in cold water and made basic with aqueous sodium hydroxide. The solid free base which precipitated was collected by filtration and recrystallized from ethyl alcohol containing a little water, M. P. 145–148° C.

*Anal.*—Calc'd. for $C_{11}H_{11}N_2Br$: C, 52.60; H, 4.42; N, 11.16; Br, 31.82. Found: C, 52.50; H, 4.40; N, 11.08; Br, 31.55.

EXAMPLE V

2-imino-3-(or 4-)phenyl-5-bromopyrroline hydrobromide from phenylsuccinonitrile

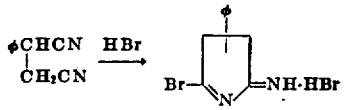

Dry hydrogen bromide was passed over the surface of a stirred solution of 5 parts of phenylsuccinonitrile (prepared according to the directions of Mowry, J. Am. Chem. Soc., 65, 2108 (1946)) in 88 parts of dry benzene. A white solid formed slowly which amounted to 9 parts when collected by filtration and dried.

*Anal.*—Calc'd for $C_{10}H_9N_2Br \cdot HBr$: C, 37.76; H, 3.17; N, 8.81; Br, 50.26. Found: C, 37.05; H, 3.12; N, 9.03; Br, 50.10.

Two parts of this pyrroline were dissolved in cold water and the solution made basic with sodium hydroxide. Flat, plate-like crystals formed slowly. A sample, after recrystallization from acetonitrile, melted at 211–215° C. (dec.), and proved to be 2-imino-3-(or 4-)phenyl-5-pyrrolidone.

*Anal.*—Calc'd. for $C_{10}H_{10}N_2O$: C, 68.94; H, 5.79; N, 16.08. Found: C, 68.45; H, 5.60; N, 16.47.

EXAMPLE VI

2-imino-3-(or 4-)bromo-5-bromopyrroline from fumaronitrile

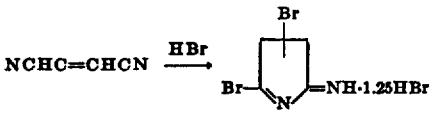

A filtered solution of 15.6 parts of fumaronitrile in 175 parts of sodium dried toluene was treated with anhydrous hydrogen bromide. A dense, gray-brown solid slowly formed which amounted to 68 parts when filtered and dried. A sample was dried further at 1 mm. pressure and 56° C.

*Anal.*—Calc'd. for $C_4H_4N_2Br_2 \cdot 1.25HBr$: C, 14.1; H, 1.55; N, 8.27; Br, 76.3. Found: C, 14.8; H, 1.83; N, 7.80; Br, 77.3.

EXAMPLE VII

*2-imino-3-(or 4-)methylmercapto-5-bromopyrroline from methylmercaptosuccinonitrile*

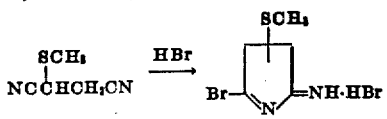

Dry hydrogen bromide was passed over a cold stirred solution of 10 parts of methylmercaptosuccinonitrile (obtained by the reaction of methyl mercaptan with furmaronitrile) in 88 parts of dry benzene. An oil formed which slowly solidified. There resulted 20 parts of hygroscopic solid.

*Anal.*—Calc'd. for $C_5H_7N_2BrS \cdot 1.2HBr$: C, 19.7; H, 2.69; N, 9.20; S, 10.5; Br, 57.8. Found: C, 19.10; H, 2.94; N, 8.86; S, 10.84; Br, 54.98.

EXAMPLE VIII

*2-imino-6-iodopiperideine hydroiodide from glutaronitrile*

By the general procedure of Example I, dry hydrogen iodide was passed over a solution of 9.4 parts of glutaronitrile in 175 parts of benzene. There separated from the solution 2-imino-6-iodopiperideine hydroiodide as a yellow solid.

When the above compound was added to cold aqueous sodium hydroxide, the corresponding 2-imino-6-iodopiperideine was obtained in the form of the base. The base was free from ionic iodine.

EXAMPLE IX

*2-imino-3-(or 4- or 5-)bromo-6-bromopiperideine hydrobromide*

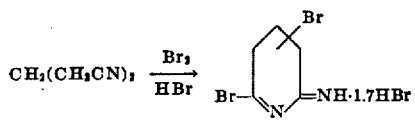

Dry hydrogen bromide was passed through a solution of 9.4 parts of glutaronitrile, 88 parts of dry benzene and 16 parts of bromine. A dense yellow solid formed immediately and no bromine color remained after 5 minutes. The solid (32 parts) was collected by filtration and dried.

*Anal.*—Calc'd. for $C_5H_8N_2Br_2 \cdot 1.7HBr$: C, 15.32; H, 1.96; N, 7.16; Br. 75.3. Found: C, 15.64; H, 2.11; N, 6.81; Br, 75.9.

The corresponding free base (dibromo-2-iminopiperideine) was obtained by addition of 30 parts of the above salt to 77 parts of anhydrous ammonia. Upon evaporation of the ammonia, 2 parts of water-insoluble crude product was obtained. This was recrystallized by dissolving in aqueous hydrogen bromide followed by addition of a base. This piperideine melted at 120–130° C. (dec.).

*Anal.*—Calc'd. for $C_5H_6N_2Br_2$: C, 23.65; N, 2.38; N, 11.03; Br, 63.09. Found: C, 23.73; H, 2.53; N, 11.14; Br, 62.59.

When the dibromoiminopiperideine hydrobromide was dissolved in cold methanol to which absolute ether was then added, in about 16 hours large plate-like crystals of 2-imino-3-(or 4- or 5-)bromopiperidone hydrobromide formed.

*Anal.*—Calc'd. for $C_5H_7N_2BrO \cdot HBr$: C, 22.08; H, 2.97; N, 10.30; Br, 58.77. Found: C, 22.31; H, 3.16; N, 10.30; Br, 57.71.

The above salt was dissolved in water at 5° C. and made basic with cold sodium hydroxide solution. There was obtained by filtration the resulting 2-imino-3-(or 4- or 5-)bromopiperidone.

*Anal.*—Calc'd. for $C_5H_7N_2BrO$: C, 31.43; H, 3.69; N, 14.67; Br. 41.83. Found: C, 31.98; H, 31.81; N, 14.51; Br, 41.34.

The new nitrogen-containing heterocyclic compounds of this invention are represented by the formula:

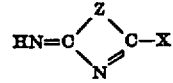

wherein X is a halogen atom with an atomic number of 35 to 53 and Z is a diradical free from active hydrogen having an aliphatic chain of from two to three carbon atoms, each bearing at least one hydrogen atom, the ring carbons adjacent to the ring nitrogen being separated by said aliphatic chain of from two to three carbon atoms and forming therewith a five to six membered heterocyclic ring.

Although tautomeric structures can be formulated for these compounds, the new compounds of this invention are represented as having the imino group and a double bond in the ring as indicated by the formulas above.

In addition to the compounds of the examples, the scope of this invention also includes 2-imino-3-(or 4-)-ethyl-5-bromo- and iodopyrroline hydrobromide and hydroiodide, respectively, 2-imino-3-ethyl-4-methyl-5-bromopyrroline hydrobromide, 2-imino-3,5-dimethyl-4-phenyl-6-bromopiperideine hydrobromide, 2-imino-4-n-butyl-6-iodopiperideine hydroiodide, and 2-imino-3-(5-)chloro-6-bromopiperideine.

The process of this invention as illustrated in the examples involves the reaction of anhydrous hydrogen bromide or hydrogen iodide on a 1,4- or a 1,5-dinitrile. The dinitriles can have at most one halogen, hydrocarbon, ether or thioether grouping of up to eight carbons on each chain carbon although preferably only one chain carbon atom is thus substituted. The dinitriles are free from active hydrogen. In addition to the dinitriles of the examples, the following can be employed: ethylsuccinonitrile, α-ethyl-β-methylsuccinonitrile, α,γ-dimethyl-β-phenylglutaronitrile, β-n-butylglutaronitrile, and β-chloroglutaronitrile.

Anhydrous inert solvents or diluents are preferably employed with the dinitrile in the reaction with the hydrogen halide. Suitable solvents are aromatic hydrocarbons such as benzene or toluene. The hydrogen halide salt of the desired compounds of this invention precipitates out when prepared in this manner.

The preparations are generally conducted at temperatures of 0–50° C. with times of at least a few minutes. The time is not critical and probably depends on the rate at which the hydrogen halide is introduced.

The salts are more stable than the free bases. The hydrogen halide salts can be converted to other acid salts, such as the nitrate and sulfate. The free base can be obtained by treating a cold solution of an acid salt with an ion exchange resin or a cold solution of the calculated stoichiometric amount of an alkali metal alkoxide, e. g., sodium ethoxide, or an alkali metal base, e. g., sodium hydroxide. The free bases of the six membered heterocyclic compounds are more stable and easier to obtain than those of the five-membered rings. Excess alkali may attack nuclear halogen, particularly in the case of the pyrrolines and produce the pyrrolidone as shown in Examples III and V. The piperideines can likewise be obtained by the use of an acid acceptor as shown in Example IX.

The compounds of this invention are useful in fungicidal applications. For example, the hydrobromides of the piperideines of the examples were dissolved in water to form a 0.2 percent solution which was sprayed onto tomato foliage. After the deposit had dried, the foliage was inoculated with the early blight fungus. Lesion counts that were made three days after the inoculation showed that the compounds prevented the fungus disease.

The compounds of this invention can be converted to a variety of derivatives. The bromine and imino groups are particularly reactive. Thus the pyrrolines, as shown in the examples, can be converted to pyrrolones which, in turn, can be polymerized to nylon-type polymers useful for fiber preparation.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A nitrogen-containing heterocyclic compound selected from the class consisting of the free bases of alpha-halo-alpha'-imino-substituted pyrrolines and piperideines and their acid salts, said nitrogen-containing heterocyclic compound having a five- to six-membered heterocyclic ring consisting of carbon atoms and one nitrogen atom wherein one of the ring carbons bonded to ring nitrogen is singly bonded thereto and bears an exocyclic imino group and the other of the ring carbons bonded to ring nitrogen is doubly bonded thereto and bears an exocyclic halogen atom of atomic number 35 to 53, and the remaining ring carbons are aliphatically saturated and each bears at most one monovalent substituent selected from the class consisting of halogen, monovalent hydrocarbon radicals of not more than 8 carbon atoms, and ether-containing hydrocarbon and thioether-containing hydrocarbon radicals of not more than 8 carbon atoms.

2. A nitrogen-containing heterocyclic compound having a five-membered heterocyclic ring consisting of carbon atoms and one nitrogen atom wherein one of the ring carbons bonded to ring nitrogen is singly bonded thereto and bears an exocyclic imino group and the other of the ring carbons bonded to ring nitrogen is doubly bonded thereto and bears an exocyclic halogen atom of atomic number 35 to 53, and the remaining ring carbons are aliphatically saturated and each bears at most one monovalent hydrocarbon radical of not more than 8 carbon atoms.

3. A nitrogen-containing heterocyclic compound having a six-membered heterocyclic ring consisting of carbon atoms and one nitrogen atom wherein one of the ring carbons bonded to ring nitrogen is singly bonded thereto and bears an exocyclic imino group and the other of the ring carbons bonded to ring nitrogen is doubly bonded thereto and bears an exocyclic halogen atom of atomic number 35 to 53, and the remaining ring carbons are aliphatically saturated and each bears at most one monovalent hydrogen radical of not more than 8 carbon atoms.

4. An alpha-halo-alpha'-iminopiperideine represented by the formula

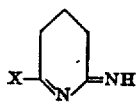

wherein X is halogen of atomic number 35 to 53.

5. A hydrobromide salt of a nitrogen-containing heterocyclic compound as set forth in claim 4.

6. An acid salt of a nitrogen-containing heterocyclic compound as set forth in claim 4.

7. 2-imino-5-bromopyrroline represented by the formula

8. 2-imino-6-bromopiperideine represented by the formula

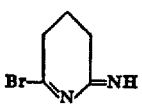

9. An acid salt of 2-imino-6-bromopiperideine as set forth in claim 8.

10. A hydrobromide salt of 2-imino-6-bromopiperideine as set forth in claim 8.

11. A 2-imino-phenyl-5-bromopyrroline represented by the formula

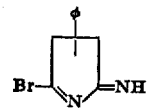

wherein φ is the phenyl radical.

12. A 2-imino-phenyl-6-bromopiperideine represented by the formula

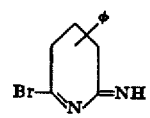

wherein φ is the phenyl radical.

13. An alpha-halo-alpha'-iminopyrroline represented by the formula

wherein X is halogen of atomic number 35 to 53.

14. An alpha-halo-alpha'-imino-substituted piperideine represented by the formula

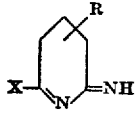

wherein X is halogen of atomic number 35 to 53, and R is a monovalent hydrocarbon radical of not more than 8 carbon atoms.

15. An alpha-halo-alpha'-imino-substituted pyrroline represented by the formula

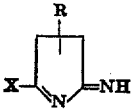

wherein X is halogen of atomic number 35 to 53, and R is a monovalent hydrocarbon radical of not more than 8 carbon atoms.

16. Process for preparing a nitrogen-containing heterocyclic compound which comprises bringing into contact and reacting under anhydrous conditions a hydrogen halide in which the halogen has an atomic number of at least 35 with a dinitrile having the nitrile groups separated by a chain of 2 to 3 aliphatic carbons each bearing at least one hydrogen atom and at most one monovalent substituent free from active hydrogen.

17. Process for preparing a nitrogen-containing heterocyclic compound which comprises bringing into contact and reacting under anhydrous conditions a hydrogen halide in which the halogen has an atomic number of at least 35 with a dinitrile having the nitrile groups separated by a chain of 2 to 3 aliphatic carbons each bearing at least one hydrogen atom and at most one monovalent substituent selected from the class consisting of halogen, hydrocarbon, ether-containing hydrocarbon and thioether-containing hydrocarbon monovalent radicals.

18. Process for preparing a nitrogen-containing heterocyclic compound which comprises bringing into contact and reacting under anhydrous conditions a hydrogen halide in which the halogen has an atomic number of at least 35 with a dinitrile having the nitrile groups separated by a chain of 2 to 3 aliphatic carbons each bearing two hydrogen atoms.

19. Process for preparing a nitrogen-containing heterocyclic compound as set forth in claim 18 wherein said dinitrile is succinonitrile.

20. Process for preparing a nitrogen-containing heterocyclic compound as set forth in claim 18 wherein said dinitrile is glutaronitrile.

21. Process for preparing a nitrogen-containing heterocyclic compound which comprises bringing into contact and reacting under anhydrous conditions hydrogen bromide with succinonitrile.

22. Process for preparing a nitrogen-containing heterocyclic compound which comprises bringing into contact and reacting under anhydrous conditions hydrogen bromide with glutaronitrile.

23. Process for preparing a nitrogen-containing heterocyclic compound which comprises bringing into contact and reacting under anhydrous conditions a hydrogen halide in which the halogen has an atomic number of at least 35 with a dinitrile having the nitrile groups separated by a chain of 2 to 3 aliphatic carbons at least one of which bears a hydrogen atom and a monovalent hydrocarbon radical and each of the remaining aliphatic carbons in said chain bears two hydrogen atoms.

24. Process for preparing a nitrogen-containing heterocyclic compound which comprises bringing into contact and reacting under anhydrous conditions hydrogen bromide with phenylsuccinononitrile.

25. Process for preparing a nitrogen-containing heterocyclic compound which comprises bringing into contact and reacting under anhydrous conditions hydrogen bromide with alpha-phenylglutaronitrile.

References Cited in the file of this patent

Wibaut et al.: Chem. Abstracts, vol 33, col. 8615 (1939).

UNITED STATES PATENT OFFICE

CERTIFICATE OF CORRECTION

Patent No. 2,810,726　　　　　　　　　　　　　　　October 22, 1957

Edward G. Howard, Jr.

It is hereby certified that error appears in the printed specification of the above numbered patent requiring correction and that the said Letters Patent should read as corrected below.

Column 7, line 48, for "hydrogen radical" read -- hydrocarbon radical --.

Signed and sealed this 17th day of December 1957.

(SEAL)
Attest:

KARL H. AXLINE
Attesting Officer

ROBERT C. WATSON
Commissioner of Patents